(12) United States Patent
Leitersdorf

(10) Patent No.: US 9,460,045 B2
(45) Date of Patent: Oct. 4, 2016

(54) APPARATUS FOR REAL-TIME MANAGEMENT OF THE PERFORMANCE OF SECURITY COMPONENTS OF A NETWORK SYSTEM

(75) Inventor: Yonadav Leitersdorf, Tel Aviv (IL)

(73) Assignee: Indeni, Ltd., Tel Aviv (IL)

( * ) Notice: Subject to any disclaimer, the term of this patent is extended or adjusted under 35 U.S.C. 154(b) by 299 days.

(21) Appl. No.: 13/016,090

(22) Filed: Jan. 28, 2011

(65) Prior Publication Data
US 2011/0191836 A1    Aug. 4, 2011

Related U.S. Application Data

(60) Provisional application No. 61/300,464, filed on Feb. 2, 2010.

(51) Int. Cl.
G06F 17/30    (2006.01)
G06F 15/16    (2006.01)
G06F 15/173   (2006.01)

(52) U.S. Cl.
CPC .............. *G06F 15/16* (2013.01); *G06F 15/173* (2013.01)

(58) Field of Classification Search
None
See application file for complete search history.

(56) References Cited

U.S. PATENT DOCUMENTS

| | | | |
|---|---|---|---|
| 5,148,481 A | 9/1992 | Abraham et al. | |
| 6,742,141 B1 | 5/2004 | Miller | |
| 7,100,085 B2 | 8/2006 | Miller | |
| 7,293,087 B2 | 11/2007 | Styles et al. | |
| 7,421,716 B1 * | 9/2008 | Margulis | G06F 8/60 719/316 |
| 7,448,073 B2 | 11/2008 | Rosenberger | |
| 7,533,186 B2 | 5/2009 | Raman | |
| 7,574,511 B2 | 8/2009 | Pujol et al. | |
| 7,613,193 B2 | 11/2009 | Swami et al. | |
| 7,647,522 B2 | 1/2010 | Meijer et al. | |
| 7,685,261 B1 * | 3/2010 | Marinelli et al. | 709/220 |
| 8,069,242 B2 * | 11/2011 | Hadar | G06F 9/5072 709/223 |
| 8,346,929 B1 * | 1/2013 | Lai | G06Q 10/10 709/226 |
| 2006/0075128 A1 | 4/2006 | Kotler et al. | |
| 2006/0184682 A1 | 8/2006 | Suchowski et al. | |
| 2006/0200548 A1 | 9/2006 | Min | |
| 2006/0230129 A1 * | 10/2006 | Swami et al. | 709/223 |
| 2007/0130457 A1 * | 6/2007 | Kamat et al. | 713/151 |
| 2009/0138938 A1 * | 5/2009 | Harrison et al. | 726/1 |
| 2009/0271504 A1 * | 10/2009 | Ginter et al. | 709/220 |
| 2010/0017843 A1 * | 1/2010 | Hilerio et al. | 726/1 |
| 2010/0050249 A1 * | 2/2010 | Newman | 726/15 |
| 2010/0228854 A1 * | 9/2010 | Morrison et al. | 709/224 |
| 2011/0040826 A1 * | 2/2011 | Chadzelek et al. | 709/203 |
| 2011/0067107 A1 * | 3/2011 | Weeks et al. | 726/23 |

* cited by examiner

Primary Examiner — Jason K. Gee
Assistant Examiner — Olanrewaju Bucknor
(74) Attorney, Agent, or Firm — M&B IP Analysts, LLC

(57) ABSTRACT

An apparatus for real-time management of a plurality of security components (SCs) connected to a network. The apparatus comprises a network interface for communication with the plurality of SCs connected to the network; a permanent storage unit for storing at least logon information to each of the plurality of SCs; a security component management unit (SCMU) having a plurality of integration point components (IPCs) enabled to identify the plurality of SCs connected to the network; a temporal storage unit for storing at least data collected from the plurality of SCs in the form of information units, each of the information units has a predefined limited lifetime after which such information unit is voided, thereby rendering the apparatus stateless; and a processing unit for carrying out at least one process designated to perform a specific generic task irrespective of a physical manifestation of each of the plurality of SCs.

19 Claims, 4 Drawing Sheets

```
// Iterate over all components
for (SecurityComponentModel component : SecurityComponents.getAllComponents()) {
        // Get the current date/time
        Calendar now = Calendar.getInstance();

// Get how often a backup should be created for this specific security component.
        // The parameter may be set by the user for each component separately, or for all
        // of them together. The parameter also has a default value of 24 hours.
        int backupInterval = getComponentSpecificConfigurationValue(
                component, howOftenToBackupParam);

// Did enough time pass since the last backup date? Note that if the backup never
        // occurred, getLastBackupDate returns 01/01/1970
        if (
                (now.getTimeInMillis() – component.getLastBackupDate().getTimeInMillis()) / 1000
                > backupInterval) {
                // Should backup, too much time has passed. Note that since we do not do
                // anything without user approval (one-time or infinite), we must register a
                // remediation task. Note that the user always receives an alert for any
                // remediation task registered, whether it is autoremediated or not.
                // The first parameter is the component for which the remediation task is
                // being registered, the second and third are the task's headline and
                // description, respectively.
                registerRemediationTask(
                        component, "A security component should be backed up",
                        component.getName() + " has not been backed up lately, " +
                                "and should be " +
                                "backed up now. You may do this manually, or " +
                                "have the system do it automatically. "
                        );

// If the user chooses to backup manually, then getLastBackupDate will
                // still be updated and the above task will no longer appear. If the user
                // chooses to approve autoremediation, or if the user has already set
                // Autoremediate for this process to "Always" (instead of "Ask"), then the
                // following code will be executed (in a separate function called
                // "remediate"):
                //      component.executeBackup();
                //      alertAutoremediationSuccessful(component);
        }
}
```

FIGURE 3

```
// Iterate over all components
for (SecurityComponentModel component : SecurityComponents.getAllComponents()) {

// Review the recent debug lines – did a policy installation fail due to reason
    // XYZ? Note that there are at least dozens of other processes regarding policy
    // installation failure, each with a different reason. They execute in parallel and
    // are unaware of each other. Only one of them will actually pass its "if"
    // statement (similarly to the one below).
    if (
            component.getRecentDebugLines().contains("policy installation failed")
            &&
            component.getRecentDebugLines().contains("reason XYZ")) {
        // The installation of a security policy has failed due to reason XYZ, the
        // system can autoremediate if allowed to. Note that the user always
        // receives an alert for any remediation task registered, whether it is
        // autoremediated or not.
        // The first parameter is the component for which the remediation task is
        // being registered, the second and third are the task's headline and
        // description, respectively.
        registerRemediationTask(
                component, "Policy installation on a security component " +
                        "has failed",
                component.getName() + " has failed to receive a policy due to " +
                        "reason XYZ. Resolution requires the modification " +
                        "of parameter A " +
                        "and setting its value to B. You may do this" +
                        "manually, or have the system do it automatically. "
                );

// If the user chooses to resolve this manually, then getRecentDebugLines
        // will no longer contain policy installation failed (as required above). If
        // the user chooses to approve autoremediation, or if the user has already
        // set Autoremediate for this process to "Always" (instead of "Ask"),
        // then the following code will be executed (in a separate function called
        // "remediate"):
        //     component.setSystemParameter("A", "B");
        //     alertAutoremediationSuccessful(component);
    }
}
```

FIGURE 4

APPARATUS FOR REAL-TIME MANAGEMENT OF THE PERFORMANCE OF SECURITY COMPONENTS OF A NETWORK SYSTEM

CROSS-REFERENCE TO RELATED APPLICATIONS

This application claims the benefit of U.S. provisional patent application No. 61/300,464 filed Feb. 2, 2010, which is hereby incorporated by reference in its entirety.

TECHNICAL FIELD

The invention relates generally to the field of network security components, and more specifically to identification and monitoring of the health of components in a network and particularly the health of security components in a network.

BACKGROUND OF THE INVENTION

Networks have developed over the years in significant and meaningful ways and can now be found in widespread use. The management of other than very basic networks is left to information technology (IT) professionals who specialize in the management of such complex networks. A specific challenge of a network is maintaining its high level of security to prevent malicious use or even damage to the network and its various components. With this aim, many security components are now installed as part of the network, for example, firewalls, that attempt to protect the network from such malicious use. As more and more components are added to the network and as additional security components (SCs) are added, the management of such components becomes increasingly complex. SCs include, but are not limited to, firewalls, intrusion prevention systems (IPSs), network access control (NAC) systems, data loss prevention (DLP) systems, web application firewalls (WAFs), and the like.

During normal operation, SCs encounter many events that affect the operation of the network and its components. For example, a security device may exhibit abnormal load that requires prioritization of operations it performs. Such abnormal behavior is usually detected as a failure point or as an alert and requires manual intervention by the IT professional. The manual intervention may be not only slow relative to the occurrence of the event, but in many cases, may also suffer from inconsistency as well as have an adverse effect on other security components, thereby causing an avalanche effect through the network and reducing its overall performance.

In view of the limitations of the prior art it would be advantageous to provide an apparatus that would be able to overcome the shortcomings and enable optimal performance of the network, while maintaining the overall health of at least its plurality of security components.

SUMMARY OF THE INVENTION

Certain embodiments of the invention include an apparatus for real-time management of a plurality of security components (SCs) connected to a network. The apparatus comprises a network interface for communication with the plurality of security components connected to the network; a permanent storage unit for storing at least logon information to each of the plurality of security components; a security component management unit (SCMU) having a plurality of integration point components (IPCs) enabled to identify the plurality of security components connected to the network; a temporal storage unit for storing at least data collected from the plurality of security components in the form of information units, wherein each of the information units stored in said temporal storage unit has a predefined limited lifetime after which such information unit is voided thereby rendering the apparatus stateless; and a processing unit coupled to at least the temporal storage for carrying out at least one process, the at least one process designated to perform a specific generic task irrespective of a physical manifestation of each of the plurality of security components.

Certain embodiments of the invention also include a method for management of security components of a network. The method comprises identifying at least one security component of the network; attempting to access the at least one security component; interrogating the at least security component and storing in a temporal memory the information retrieved from the at least one security component; and monitoring performance and operation of the security component using the retrieved information, wherein the monitoring is a generic task being agnostic to a physical manifestation of the at least one security component.

BRIEF DESCRIPTION OF THE DRAWINGS

It is important to note that the embodiments disclosed by the invention are only examples of the many advantageous uses of the innovative teachings herein. In general, statements made in the specification of the present application do not necessarily limit any of the various claimed inventions.

FIG. 3 is a process for backing up security components of the network in accordance with an embodiment of the invention; and FIG. 4 is a process for identification of a security policy installation failure in accordance with an embodiment of the invention.

DETAILED DESCRIPTION OF THE INVENTION

Figure 1:
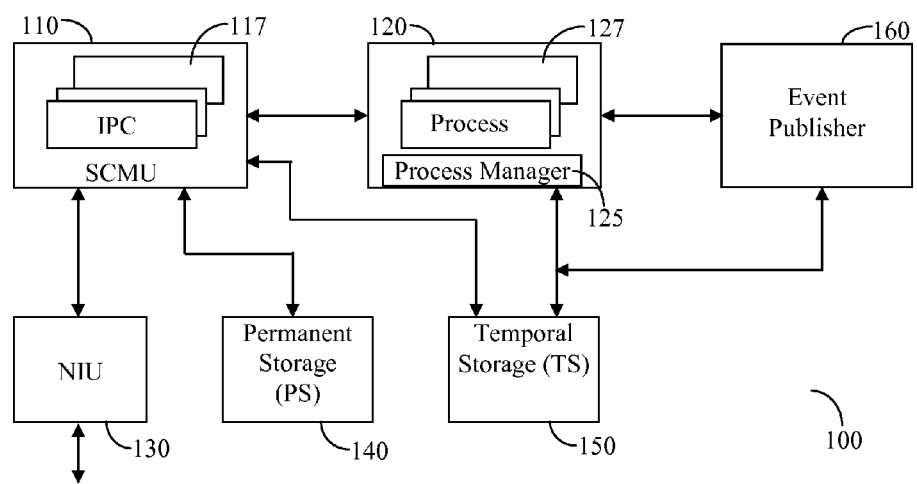
FIG. 1 is a schematic block diagram of an apparatus for management of security components of a network in accordance with the principles of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A non-limiting embodiment of the invention provides an apparatus for identifying and managing the security components (SCs) connected to the network protected by firewalls. Once SCs are identified, the apparatus monitors the performance of each SC based on its attributes. The apparatus includes a security components'management unit (SCMU) that is responsible for the interaction with the plurality of SCs of the network. A processing unit (PU) performs stateless execution of a plurality of generic processes, each process being a simple action with respect to a security function regardless of the physical manifestation of an SC. The apparatus is therefore capable of identifying and remedying health problems of components in the network in general, and SCs in particular, in real-time, without involvement of an information technology (IT) professional, or providing alerts thereto.

FIG. 1 depicts an exemplary and non-limiting schematic block diagram 100 of an apparatus for real-time management of security components of a network in accordance with the principles of the invention. The security component management unit (SCMU) 110 and the processing unit (PU) 120 are units of the apparatus 100. The SCMU 110, under the control of processes executing on the PU 120, and as explained in more detail herein below, is responsible for the identification, interrogation, and management of the actual security components of the network. The SCMU 110 is connected to a network interface unit (NIU) 130 that is connected to a network. The network may be a local area network (LAN), a wide area network (WAN), a metropolitan network area (MAN), the worldwide web (WWW), the Internet, the likes and any combinations thereof, as well as wired and wireless networks. Thus, a connection between the apparatus 100 and the network may be a wireless connection, a wired connection, or combination thereof.

The SCMU 110 communicates via a network interface unit (NIU) 130 with the security components of the network (not shown). The SCMU 110 is connected to a permanent storage (PS) 140 that holds information that is determined to be persistent over time. Such information includes, for example but without limitation, the username and password of an identified SC that is provided to the SCMU 110 and enables the communication therewith.

The PU 120 executes a plurality of processes, each process designated to address a generic performance issue, and in particular those issues that pertain to the performance of security components of a network. Hence, a process performed by the PU 120 may control one or more SCs on the network. The processes executing on the PU 120 notify the SCMU 110 of any required actions, for example, a request for interrogation of the network, a request for checking the load on the SCs, and so on. Each process is agnostic to the specific SC manifestation which is easily controllable through the generic task. The SCMU 110, responsive of information received from SCs, stores such information in a temporal storage (TS) 150. The processes executing on the PU 120 use the temporal information for the execution of the process. However, such information is transitory by nature and disappears periodically, including but not limited to power off, and then the interrogation process begins from scratch. The advantage of this temporal approach is that very little is assumed about the network environment and the SCs operating thereon. The stateless operation of the apparatus 100 means that little to no information is recorded in permanent storage regarding the history of the interaction between the apparatus and the SCs. Specifically, the TS 150 may be periodically voided in whole or portions thereof.

One or more processes 127, executed on the PU 120, operate under the control of a process manager 125 and may also have metadata. The metadata includes, but is not limited to, process name, process type, level of criticality, control parameters and more. It should be noted that while a reference is made here to generic processes, it is also possible to have processes that do not have a generic nature and are targeted to address a specific security component type. Non-limiting examples for processes 127 are provided below.

Some of the individual processes 127 implement logic for the prediction of a health problem in a SC. For example, a process may collect information regarding the current state of the "connection table" in the SC to determine when it is about to fill up and result in loss of connectivity for the network users. Another example is a process that tests that a specific SC can reach its management component which is vital for its normal operation. If it is determined that the SC cannot reach the management component over the network an alert is issued.

Some processes 127 also perform automatic remediation of one or more health problems detected in a SC. An example for such a process includes comparing the configuration of several SCs which are defined to be part of a group of components which must have identical configuration parameters. When a configuration mismatch is found, the apparatus 100 generates one or more alerts regarding the mismatch. In one embodiment it can also be set to automatically fix the mismatch, i.e., return the into compliancy with the desired configuration.

Figure 2:
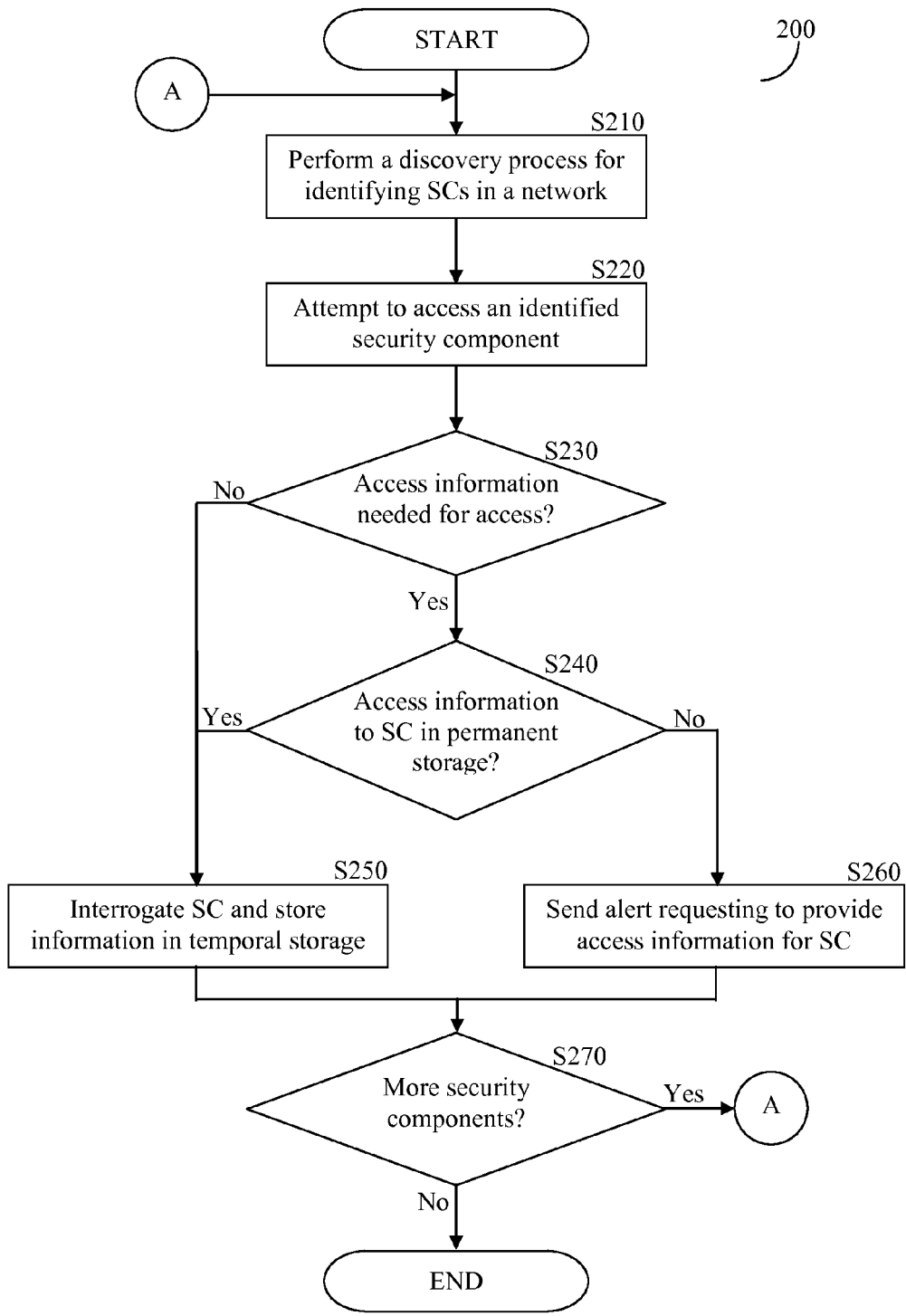
FIG. 2 is a flowchart describing the discovery process performed by the apparatus to identify and access security components coupled to the network.

FIG. 2 depicts an exemplary and non-limiting flowchart 200 describing the discovery process performed by the PU 120 to identify and access SCs connected to the network. This process takes place at least periodically and always upon restart of the apparatus 100. As noted above, the apparatus 100 is stateless which ensures that it is not bound by the limitation of past memory and only minimal assumptions are made with respect to the current state of the SCs coupled to the network to which apparatus 100 is also connected.

In S210, a discovery process of SCs coupled to the network takes place. In S220, an attempt to access a detected SC is made. In S230, it is checked whether access information, such as but not limited to, user identification and password, are requested from the SC, and if so execution continues with S240; otherwise, execution continues with S250. In S240, it is checked whether the access information for the SC already exists in the PS 140 and if so, execution continues with S250; otherwise, execution continues with S260.

In S250, the SC is interrogated for information that is then stored in TS 150. Additional discussion of this information is provided herein below. When necessary interrogation is performed after accessing the SC using the access information retrieved from the PS 140. In S260, an alert is sent to, for example, a user of the apparatus 100, requesting the access information for the SC. Typically, the apparatus 100 does not wait for a response from the manager, but rather continues operation and returns to check the SC at a later time. In S270, it is checked whether additional SCs are to be accessed, and if so execution continues with S210; otherwise, execution terminates.

FIG. 3 shows an exemplary and non-limiting process 127 for backing up security components of the network in accordance with the principles of the invention. It is the task of the process manager 125 to ensure timely execution of the process as may be necessary to schedule such an operation. However, this process may be designed to periodically backup the security components of the network at predefined time intervals, e.g., at least once every twenty-four hours, every Sunday post-midnight, and so on.

The backup process first checks how often backup is required, and if such time has arrived, or if the predefined minimum has been reached, a request is sent to get the information for the purposes of backup. It should be noted that the backup information may be stored on a permanent storage, for example, the PS 140, to enable recovery of the network system component in case of failure. In one embodiment of the invention, the user may have an option to allow for manual backup and in such case this process will not execute.

In another embodiment, the user may define a list of security components to backup while others will not require such backup or will have manual backup. Only the security components listed for backup will automatically backup. Of course, the opposite can also be true, the user can identify those security components which do not require automatic backup and such security components will not go through this backup process. It is important to note that according to an embodiment if the invention, the process is generic in nature and it is responsible for activating the operation of the backup of each and every security component of the network. The interface with the actual security component is performed by the SCMU 110 that has the ability to perform the backup for each type of security component. This separation allows an effective way for the expansion of the system. That is, adding a new type of security component merely requires including additional one or more integration point components (IPCs) 117 in the SCMU 110.

On the other hand, if new control functions are required, these take place on the process side and a single process 127 needs to be developed to control a plurality of security components. Such modification may or may not require modification of the other processes.

FIG. 4 shows the operation of another exemplary and non-limiting process 127 for identification of a security policy installation failure according to an embodiment of the invention. The process, executing on the PU 120 and under the control of the process manager 125, checks notification of a failure of an installation of a security component for a specific reason. As explained above, the process is generic by nature and, under the control of the process manager 125 communicates with SCMU 110 that in turns activates an IPC of the IPCs 117 specific to perform the required task identified by a corresponding process of processes 127 in the way that is appropriate for the specific security component.

For example, a network may be deployed with several firewall security components from more than a single vendor or having different versions of software or firmware installed. The access to the different security components for the very same task may be different. The generic process 127 is agnostic to such differences and only attempts to check the information. The IPCs 117 of SCMU 110 are specific to the security components with which it communicates. Therefore, the maintenance of the apparatus 100 is significantly simplified and, in many cases, the need for intensive involvement of IT professionals on a regular basis is eliminated.

It should be further noted that the generic processes 127 are simple and targeted to perform a single task. For example, in the example depicted in FIG. 3, the process requests the information of a specific failure type and waits to get simple results thereof. However, it is possible that processes will not perform synchronously and other processes will be handling the results returned from an action taken by another process. The SCMU 110 uses the appropriate IPC 117 that works with a security component and stores the data in the temporal storage when required. Another process may be responsible for handling the returned data on a schedule that may be completely independent of that of the interrogating process.

Returning now to FIG. 1, and as explained hereinabove, the SCMU 110 performs a plurality of tasks, through IPCs, that are related to the actual security components identified to be as part of the network to which the apparatus 100 is connected. Initially, the apparatus 100 is provided loaded with a plurality of IPCs 117 that are unique to each security component. For example, a Check Point® firewall product may have for itself a plurality of IPCs 117 as part of the SCMU 110 designated to enable control and management of that specific firewall product. Other security components may have other IPCs on SCMU 110 enabling SCMU 110 to interrogate, control and manage such components.

In an embodiment of the apparatus 100, an event publisher (EP) 160 connected to at least the PU 120 is included, to provide an interface to allow the registration of events and perform processes responsive to events under the control of processing manager 125. Thus, the EP 160 enables both system-generated events as well as user-generated events to activate processes of the PU 120. Such user-generated events may include, but are not limited to, adding a SC to the list of monitored SCs, modification of a parameter which the system uses when accessing an SC, instruction by the user to automatically fix a specific problem once detected, and an instruction by the user to revalidate a specific alert issued by the system responsive to a detected problem.

For the purpose of identification of unidentified security components connected to the network, one or more dedicated IPCs are used. Such IPCs, using the possible IP addresses not previously recognized to have SCs associated therewith, attempt communication using security communication protocols, such as but not limited to, secure shell protocol (SSH). It should be noted that according to the principles of the invention, other communication protocol may be further used, and such can be activated or deactivated, added or removed, from the SCMU 110, by means of dedicated IPCs. The IPCs, upon collection of data from the SCs, store the data in the TS 150 in the form of information units. Such information units can then be used by one or more processes of the plurality of process 127.

It should be appreciated that the while in certain embodiments of the invention the apparatus 100 has been described with respect to SCs, the apparatus 100 can also interface with non-security components to provide them with information collected or otherwise processed, or to collect additional relevant information as described hereinabove.

The principles of the invention may be implemented in hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. An apparatus for real-time management of a plurality of security components (SCs) connected to a network, comprising:
   a network hardware interface configured to communicate with the plurality of security components connected to the network;
   a permanent hardware storage unit configured to store at least logon information to each of the plurality of security components;
   a temporal storage unit;
   a processing unit communicatively connected to the temporal storage unit;
   a memory communicatively connected to the processing unit, the memory containing instructions that, when executed by the processing unit, configure the apparatus to:
   control a security component management unit (SCMU) having a plurality of integration point components (IPCs) configured to identify the plurality of security components installed in the network, wherein each of the plurality of security components is configured to perform an independent security action for protecting the network;
   store in the temporal storage unit at least data collected from the plurality of security components in the form of information units, wherein each of the information units stored in the temporal storage unit has a predefined limited lifetime after which such information unit is voided, thereby rendering the apparatus stateless; and
   perform, using the information units stored in the temporal storage unit, a specific generic task irrespective of a physical manifestation of each of the plurality of security components, wherein the specific generic task is an action performed in a stateless mode, the specific generic task addresses a generic performance issue pertaining to the performance of security components installed in the network and is independent of security component type;
   check for at least a health problem in at least one of each of the security components; and
   correct the at least one health problems without involvement of a user.

2. The apparatus of claim 1, wherein communication with the plurality of security components is performed using a security communication protocol.

3. The apparatus of claim 1, wherein the security communication protocol is at least a secure shell protocol (SSH).

4. The apparatus of claim 1, wherein the identification of each of the plurality of security components comprises a logon to the security component using a username and a password stored in the permanent storage unit.

5. The apparatus of claim 1, further comprising assigning another IPC to each of the plurality of security components, the IPC collects data from its corresponding security component and stores the data in the temporal storage.

6. The apparatus of claim 1, wherein the at least one process includes monitoring performance and operation of each of the plurality of security components.

7. The apparatus of claim 1, wherein the at least one process includes backing up each of the plurality of security components.

8. The apparatus of claim 1, wherein the health problem is one security health problem.

9. The apparatus of claim 1, wherein the processing unit is further configured to identify a security policy installation failure in each of the plurality of the security components.

10. The apparatus of claim 1, wherein one IPC of the plurality IPCs communicates with one security component according to communication characteristics of the one security component.

11. The apparatus of claim 10, wherein the processing unit is further configured to access the security component through a respective IPC communicating with the security components.

12. The apparatus of claim 1, further comprises: an event publisher for enabling user-generated events to activate the at least one process.

13. A method for management of security components of a network, comprising:
   identifying at least one security component installed in the network, wherein the at least one security component is configured to perform an independent security action for protecting the network;
   attempting to access the at least one security component;
   interrogating the at least security component;
   storing in a temporal memory the information retrieved from the at least one security component, wherein each of the information units stored in the temporal storage unit has a predefined limited lifetime after which such information unit is voided thereby rendering the apparatus stateless;
   monitoring performance and operation of the security component using the retrieved information from the temporal memory in a stateless mode, wherein the monitoring is a generic task being agnostic to a physical manifestation of the at least one security component and the generic task is an action which addresses a generic performance issue pertaining to the performance of security components in the network and is independent of security component type;
   checking for at least one health problem in at least one of each of the security component; and
   correcting the at least one health problem without involvement of a use user, wherein the identification of health problems is a generic task being agnostic to a physical manifestation of the at least one security component.

14. The method of claim 13, further comprising: checking whether access information is needed to access the at least one security component; issuing a request to provide the access information for the at least one security component; and storing the access information in a permanent storage for future access to the at least one security component.

15. The method of claim 14, further comprising: periodically voiding at least a portion of the temporal memory.

16. The method of claim 13, further comprising: periodically backing up the at least one security component, wherein the backup is a generic task being agnostic to a physical manifestation of the at least one security component.

17. The method of claim 13, wherein the at least one health problem is a security health problem.

18. The method of claim 13, wherein further comprising:
identifying a security policy installation failure in the at least one security component, wherein the identification of the installation failure is a generic task being agnostic to a physical manifestation of the at least one security component.

19. A non-transitory computer readable medium having stored thereon instructions for causing one or more processing units to manage a plurality of security components (SCs) connected to a network:
- identify at least one security component installed in the network, wherein the at least one security component is configured to perform an independent security action for protecting the network;
- attempt to access the at least one security component;
- interrogate the at least one security component;
- store in a temporal memory information retrieved from the at least one security component, wherein each of the retrieved information stored in the temporal memory has a predefined limited lifetime after which such information is voided thereby rendering the apparatus stateless; and
- monitor performance and operation of the at least one security component using the retrieved information from the temporal memory in an a stateless mode, wherein the monitoring is a generic task being agnostic to a physical manifestation of the at least one security component and the generic task is an action which addresses a generic performance issue pertaining to the performance of security components in the network and is independent of security component type;
- check for at least one health problem in at least one of each of the security component; and
- correct the at least one health problem without involvement of a use user, wherein the identification of health problems is a generic task being agnostic to a physical manifestation of the at least one security component.

* * * * *